United States Patent [19]
Wang et al.

[11] Patent Number: 5,923,266
[45] Date of Patent: Jul. 13, 1999

[54] METHOD FOR DYNAMICALLY CHANGING CONTROL FRAMES FOR SELECTIVE CALL RECEIVING DEVICES

[75] Inventors: Zhonghe Wang, Lake Worth, Fla.; Kwok Keung Choi, Pleasanton, Calif.; Jyh-Han Lin, Keller, Tex.; Douglas I. Ayerst, Delray Beach, Fla.; Gregory Lewis Cannon, Keller; Jheroen Pieter Dorenbosch, Paradise, both of Tex.; Malik Khan, Elgin, Ill.; Leonard Nelson, Boynton Beach, Fla.

[73] Assignee: Motorola, Schaumburg, Ill.

[21] Appl. No.: 09/012,274

[22] Filed: Jan. 23, 1998

Related U.S. Application Data

[63] Continuation of application No. 08/862,872, May 23, 1997, Pat. No. 5,878,035, which is a continuation-in-part of application No. 08/566,497, Dec. 4, 1995, abandoned.

[51] Int. Cl.$^6$ ....................................... H04J 3/00
[52] U.S. Cl. ................. 340/825.44; 340/825.52; 340/825.47; 370/310
[58] Field of Search .......... 340/825.52, 825.44, 340/825.47, 825.22; 370/310, 3

[56] References Cited

U.S. PATENT DOCUMENTS

| 4,427,980 | 1/1984 | Fennell et al. | 340/825.52 |
| 4,713,808 | 12/1987 | Gaskill et al. | 370/314 |
| 5,325,088 | 6/1994 | Willard et al. | 340/825.2 |

*Primary Examiner*—Jacques H. Louis-Jacques
*Assistant Examiner*—Yonel Beaulieu
*Attorney, Agent, or Firm*—Pablo Meles

[57] ABSTRACT

A selective call receiving device (10) such as a pager is controlled to dynamically change a base frame assigned to the device and subsequent control frames derived therefrom. The time that the device is operative to look for its address in a received signal can thus be dynamically changed to improve the efficiencies of a mixed systems environment without substantially reducing the battery life of the selective call receiving device (10). In two embodiments of the invention a new base frame for the device is derived from an originally assigned base frame that is stored in the selective call receiving device. In another embodiment, a new base frame for the device is derived from the device's address along with frame management information that is received by the selective call receiving device.

26 Claims, 5 Drawing Sheets

|    | 0 | 1 | 2 | 3 | 4 | 5 | 6 | 7 | 8 | 9 | 10 | 11 |
|----|---|---|---|---|---|---|---|---|---|---|----|----|
| F1 | SI | SII | SI | SII | SI | SII | SI | SII | SI | SII | SI | SII |
| F2 |   | SIII |   |   |   | SIII |   |   |   | SIII |    |    |
| F3 |   | SIII | SIV |   |   | SIII |   |   |   | SIII | SIV |    |
| F4 |   | SIII |   |   |   | SIII |   |   |   | SIII |    |    | pf - FIRST PERSONAL CONTROL BASE FRAME ps + 1 - DISTANCE BETWEEN PERSONAL CONTROL BASE FRAME ps - SPACING BETWEEN PERSONAL CONTROL BASE FRAME cs + 1 - DISTANCE BETWEEN ADDITIONAL PERSONAL CONTROL FRAMES cs - SPACING BETWEEN ADDITIONAL PERSONAL CONTROL FRAMES

- ■ CONTROL FRAMES
- ▨ MESSAGE FRAMES
- ▧ INFORMATION SERVICE FRAMES (CAN CARRY ON)
- ☐ FRAMES NOT DEFINED (CAN BE BORROWED)

5,923,266

METHOD FOR DYNAMICALLY CHANGING CONTROL FRAMES FOR SELECTIVE CALL RECEIVING DEVICES

RELATED APPLICATION

This application is a continuation of application Ser. No. 08/862,872, filed May 23, 1997 by Wang et al., entitled "Method and Apparatus for Mixing Protocols in a Radio Messaging System," now U.S. Pat. No. 5,878,035, which is a continuation-in-part of application Ser. No. 08/566,497, now abandoned, filed Dec. 4, 1995 by Wang et al., entitled "Method for Dynamically Changing Control Frames for Selective Call Receiving Devices in a Mixed Systems Environment." Application Ser. No. 08/862,872 is hereby incorporated herein by reference.

FIELD OF INVENTION

The present invention relates to a selective call receiving device, such as a pager, that has an associated system and that operates in a mixed systems environment having a number of different systems sharing a frequency channel, and more particularly to a method for controlling such a selective call receiving device to dynamically change a base frame assigned to the device and subsequent control frames derived therefrom to change the time that the device is operative to look for the device's address in a received signal.

BACKGROUND OF THE INVENTION

Selective call receiving devices receive messages that are broadcast by a service provider. Known selective call receiving devices have at least one address that is assigned to the device so that it can determine whether a received signal includes a message that is intended for it. A base control frame and a collapse value are also assigned to the selective call receiving device wherein the base control frame determines the first frame of a received signal that the device decodes to determine whether its address is present and the base frame and collapse value determine the subsequent control frames that the device decodes. The base frame and collapse value of a device set a battery saving cycle for the device so that it is not drawing a high level of power continuously, but "wakes up" only when it needs to look for its address. It is noted that the lower the collapse value, the more frequently the device is required to wake up. In accordance with a known signaling protocol, a system collapse value is also employed wherein the system collapse value is broadcast to the device. The device uses the smaller of its own collapse value or the system collapse value with its assigned base frame to determine the subsequent control frames that determine when it is to "wake up."

In order for service providers to service existing customers as well as new customers with a limited bandwidth, channel sharing among different systems is desirable. Channel sharing among different systems refers to channel sharing among different signaling protocols and/or different subzones. Subzones are formed as subdivisions of a zone when it is desirable to increase the capacity of the service provider. Because the coverage area of a zone is most likely continuous and control information is simulcast in the subzones, problems can arise when a physical channel is shared among subzones. Those problems are similar to the problems encountered when systems having different signaling protocols share channels.

In order to mix systems so that they can share bandwidth, one could broadcast a small system collapse value such as 0 or 1. This approach would overcome batching or scheduling inefficiencies and long delays. However, small system collapse values result in reduced battery life of the device and are not always desirable.

SUMMARY OF THE INVENTION

A first aspect of the present invention is a method for controlling a selective call receiving device having an associated system of a plurality of different systems sharing a frequency channel. The selective call receiving device has parameters assigned thereto including at least one assigned address and an assigned base frame. The method controls the device to dynamically change the base frame assigned to the device, and the assigned base frame determines a time that the device is operative to look for the device's address in a received signal. The method comprises storing a first base frame assigned to the device and an address assigned to the device, and receiving a signal having control frame information and a reference frame identifying one of the different systems. The method further comprises determining whether the reference frame identifies the associated system, and determining a step value from the control frame information when the received signal identifies the associated system. In addition, the method includes deriving a new base frame for the device in accordance with one of the assigned parameters, the reference frame, and the step value to change the time that the device is operative to look for the device's address in the received signal.

A second aspect of the present invention is a method for controlling a selective call receiving device having an associated system, at least one assigned address, and an assigned base frame. The method controls the device to dynamically change the base frame assigned to the device, and the assigned base frame determines a time that the device is operative to look for the device's address in a received signal. The method comprises storing a first base frame assigned to the device, and receiving a signal having a reference frame identifying a system, the received signal including control frame information X and the reference frame having an associated reference frame number. The method further comprises determining whether the received signal includes a reference frame identifying the associated system, and determining a step value from the control frame information X when the received signal identifies the associated system, the step value being represented by $2^X$. The method further comprises modifying the first base frame in accordance with the reference frame number and the step value to derive a new base frame, and determining in accordance with the step value a number of frames from which the new base frame is spaced to a next successive control frame that is assigned to the device.

A third aspect of the present invention is a method for controlling a selective call receiving device having an associated system, an associated service provider, at least one assigned address, and an assigned base frame. The method controls the device to dynamically change the base frame assigned to the device, and the assigned base frame determines a time that the device is operative to look for the device's address in a received signal. The method comprises storing a first base frame assigned to the device, and detecting in the received signal a reference frame identifying one of a plurality of systems and a service provider and a plurality of frames transmitted by the one of the plurality of systems, the reference frame having a reference frame number. The method further comprises determining whether the reference frame identifies the associated system, and measuring a step value from the spacing between frames transmitted by the one of the plurality of systems when the reference frame identifies the associated system and the service provider associated with the device. The method also includes modifying the first base frame in accordance with the reference frame number and the step value to derive a new base frame.

A fourth aspect of the present invention is a method for controlling a selective call receiving device having an associated system, at least one assigned address, and an assigned base frame. The method controls the device to dynamically change the base frame assigned to the device, and the assigned base frame determines a time that the device is operative to look for the device's address in a received signal. The method comprises storing a value representing a first base frame assigned to the device, the first base frame value being formed of a plurality of bits; and receiving information representing a system base frame mask X and a system base frame offset that is a number between 0 and $2^X-1$. The method further comprises modifying the first base frame value with the base frame mask and the base frame offset to provide a new base frame to change the time that the device is operative to look for the device's address in the received signal.

A fifth aspect of the present invention is a method for controlling a selective call receiving device having an associated system of a plurality of different systems sharing a frequency channel. The selective call receiving device has parameters assigned thereto including at least one assigned address and an assigned base frame. The method controls the device to dynamically change the base frame assigned to the device, and the assigned base frame determines the time that the device is operative to look for the device's address in a received signal. The method comprises storing a first base frame assigned to the device and an address assigned to the device, and receiving a signal having control information and a reference frame identifying one of the different systems. The method further comprises determining whether the received signal identifies the associated system, and retrieving control frame information from the received signal when the received signal identifies the associated system, the control frame information including an identity of a first possible device control frame. The method also includes deriving a new base frame for the device from information assigned to the device and from the first possible device control frame.

A sixth aspect of the present invention is a method for controlling a selective call receiving device having an associated system, at least one assigned address, and an assigned base frame. The method controls the device to dynamically change the base frame assigned to the device, and the assigned base frame determines a time that the device is operative to look for the device's address in a received signal. The method comprises storing a first base frame assigned to the device and an address assigned to the device, and receiving a signal having control information and a reference frame identifying a system. The method further comprises determining whether the received signal identifies the associated system, and retrieving control frame information from the received signal if the received signal identifies the associated system, the control frame information including the identity of a first possible device control frame. The method also includes deriving a new base frame for the device from the address assigned to the device and from the first possible device control frame.

DESCRIPTION OF THE PREFERRED EMBODIMENT

Figure 1:
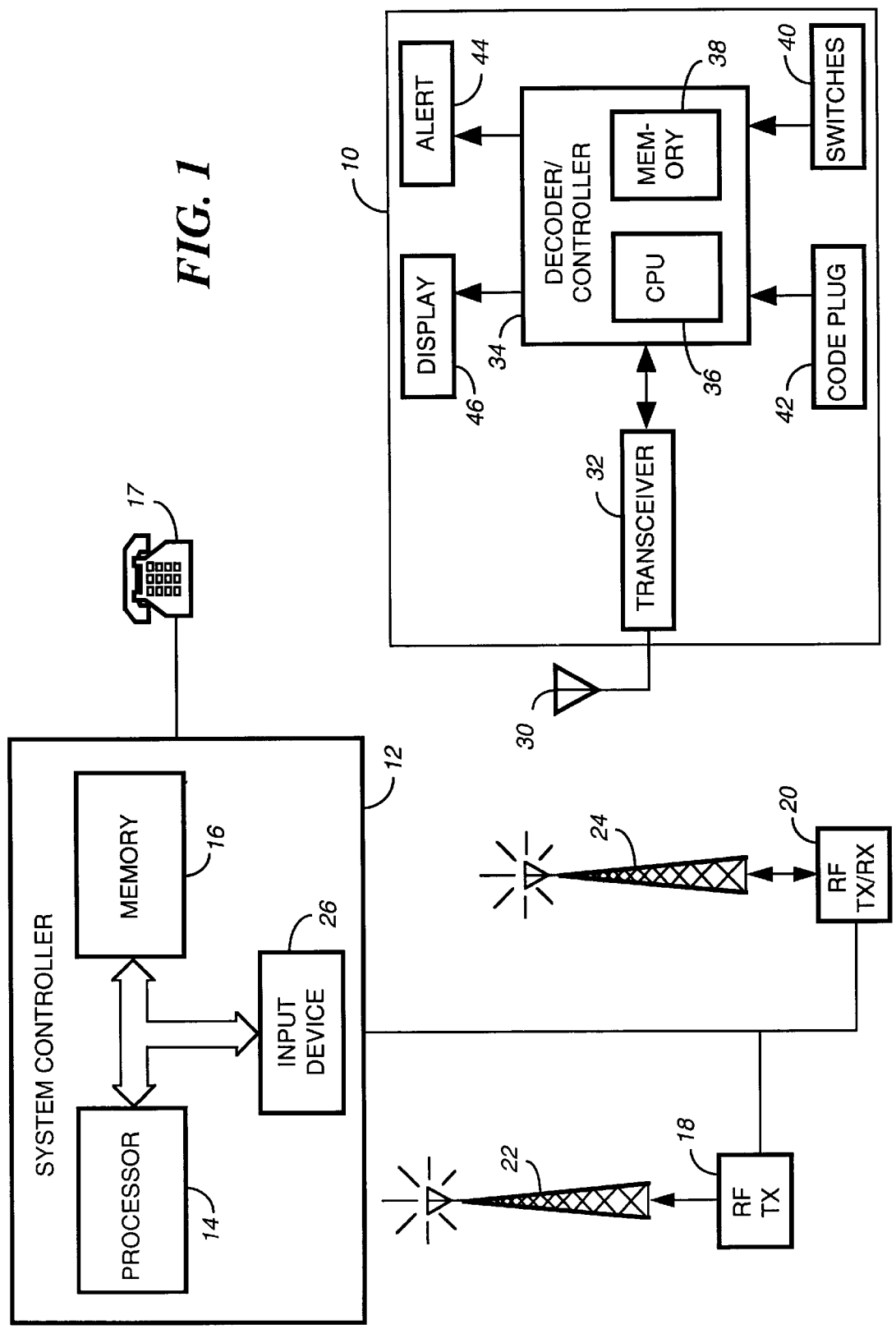
FIG. 1 is a block diagram of a selective call receiving device that is controlled in accordance with the method of the present invention in response to a signal broadcast by a system controller.

A portable selective call receiving device 10 that may be controlled in accordance with the method of the present invention to operate in a mixed systems environment is shown in FIG. 1. The selective call receiving device 10 has an associated signaling protocol and is a subscriber of a particular service provider. A controller 12, from which the device 10 receives broadcast information, is associated with the service provider of the device 10. The controller 12 is preferably capable of transmitting information to selective call receiving devices in different systems of the mixed systems environment, the different systems having different associated signaling protocols and/or subzones. In order for the controller 12 to service existing customers as well as new customers with a limited bandwidth, the controller 12 transmits information on frequency channels that are shared among the various systems i.e. signaling protocols and/or subzones. By dynamically changing the control frames that a selective call receiving device looks for to find its address in a received signal, the controller 12 is able to accommodate growth with respect to the number of customers that it services and with respect to the number of different types of signaling protocols accommodated.

As shown in FIG. 1, the controller 12 includes a processor 14 that operates in accordance with software stored in a memory 16 and that utilizes a scratch pad portion of the memory 16 to control the scheduling and encoding of messages received from an input device such as a telephone 17. The controller 12 preferably schedules and encodes messages in a number of different protocols such as the known POCSAG, FLEX™, and InFLEXion™ protocols for paging. The encoded messages are transmitted to an intended selective call receiving device 10 on an assigned radio frequency (R.F.) channel via one or more selected transmitter units 18 or transmitter/receiver units 20 having respective antenna 22, 24. Only two transmitter units are shown in FIG. 1 for simplicity, there typically being a large number of transmitter units coupled to a single controller 12 of a service provider. The transmitter units are preferably organized in zones wherein the zones are divided into subzones in which control information is simulcast. The division of zones into subzones allows the service provider to increase its capacity. An input device 26 such as a keyboard or the like is provided for the system controller 12 so that an operator may input various parameter values to affect changes for the accommodation of growth in the network.

The selective call receiving device 10 is shown in FIG. 1 in the form of a two-way pager. As will be appreciated, the present invention is applicable to other selective call receiving devices, such as one way communication devices or two-way communication devices that are not pagers, as well. The selective call receiving device 10 includes an antenna 30 for intercepting transmitted RF signals and for transmitting RF signals. The antenna 30 couples a received signal to a transceiver 32 wherein the transceiver 32 produces a data stream representative of a demodulated received signal that is coupled to a decoder/controller 34. The transceiver 32 is also responsive to a modulation input such as data received from the decoder/controller 34 to frequency modulate a carrier signal for transmission out from the selective call receiving device 10. The decoder/controller 34 includes a central processing unit or the like for processing demodulated signal information in accordance with software stored in a memory 38. A demodulated message is then displayed on a display 46 under the control of the decoder/controller 34. The decoder/controller 34 is also responsive to inputs from one or more switches 40 or other input devices to generate data that is coupled to the transceiver 32 for transmission out from the selective call receiving device 10.

A code plug memory 42 of the selective call receiving device 10 stores information originally assigned to the device 10. This information includes at least one address that identifies the device 10; a base control frame that determines the first frame in one cycle of the device's signaling protocol that the device 10 wakes up for in order to decode at least a portion of the frame to determine if its address is present; and a device collapse value that is used to determine the subsequent control frames in one cycle of the signaling protocol that the device 10 also decodes to determine if its address is present. When the decoder/controller 34 determines that there is a match between a received address and an address stored in the code plug 42 as determined by a comparison of the received and stored addresses, an alert signal is generated by a device 44 so as to alert a user that a message has been received by the device 10. It is noted that the alert signal may be an audible and/or a tactile alert such as a silent, vibrating alert.

Figure 2:
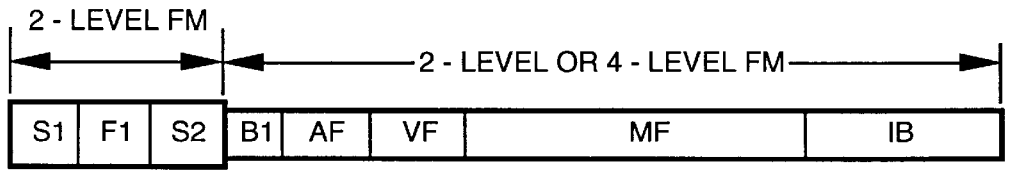
FIG. 2 is an illustration of a known signaling protocol.

In order to illustrate the different embodiments of the present invention, they will be described in relation to the FLEX™ family of signaling protocols. Each signaling protocol of the FLEX™ family has 128 frames per cycle in a 4 minute period wherein the frames are numbered from 0 to 127. Each of these frames has the field order illustrated in FIG. 2 wherein S1 is a synchronization pattern followed by a frame information word F1 which is in turn followed by a second synchronization word S2. Thereafter, block information words BI are followed by an address field AF, vector field VF, message field MF and idle blocks. The various embodiments of the method of the present invention allow different signaling protocols of the FLEX™ family to be mixed together and with other known signaling protocols such as POCSAG. However, the present invention is not limited to mixed systems with these protocols, but is applicable to mixed systems with other signaling protocols and/or subzones as well.

Figure 3:
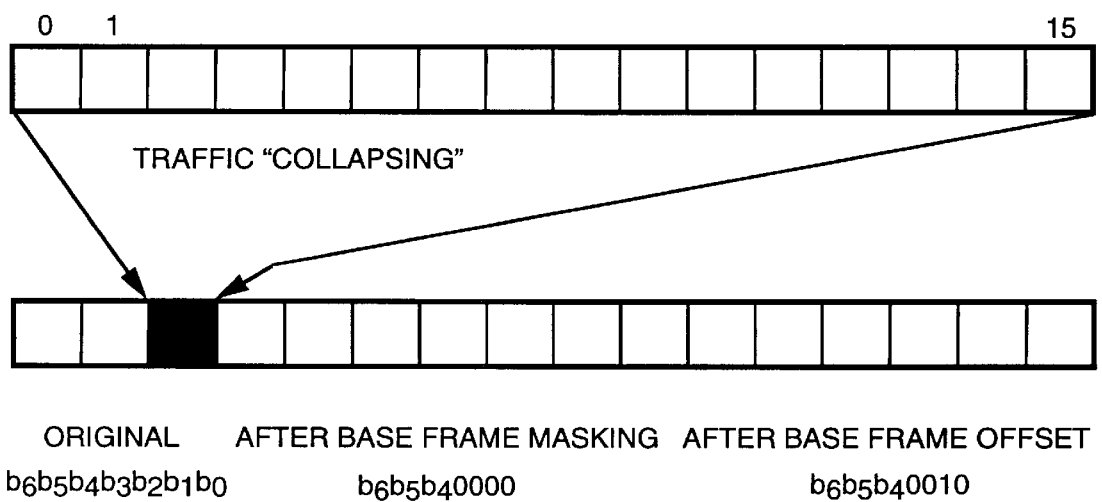
FIG. 3 is a graphic illustration of a method in accordance with one embodiment of the present invention for generating a new base frame from an originally assigned base frame and control frame information so as to collapse frame traffic of a number of frames into a single frame.

In accordance with one embodiment of the present invention as illustrated in FIG. 3, the system controller 12 collects message traffic dispersed among a number of frames into one frame to improve air time utilization in a mixed systems environment and to ease system migration. This embodiment further preserves the battery saving cycle of a selective call receiving device 10 which is determined by the frequency that the device 10 has to wake up to decode portions of a received signal to determine if the received signal contains the device's address. This method allows channel sharing between different signaling protocols to be easily accomplished.

In accordance with the method illustrated in FIG. 3, control frame information is transmitted in the block information words BI of the signaling protocol wherein a block information word is typically sent at the beginning of each frame in a cycle of the signaling protocol as discussed above. The control frame information includes a system base frame mask and a system base frame offset. The system base frame mask is an integer between 0 and N where there are $2^N$ frames in one cycle of the signaling protocol. For example, in a signaling protocol of the FLEX™ family having 128 frames in one cycle, the system base frame mask is an integer between 0 and 7. The system base frame offset is a number that is selected between 0 and $2^{(system\ base\ frame\ mask)}-1$.

The decoder/controller 34 of the device 10 operating in accordance with this method is responsive to the receipt of a system based frame mask and a system based frame offset to modify its originally assigned base frame as stored in the code plug memory 42 to derive an effective or new base frame. Specifically, in response to the receipt of a system based frame mask M and a system base frame offset F, the decoder/controller 34 sets to zero the M least significant bits of the originally assigned base frame stored in the code plug 42 and then adds the offset F thereto in order to form the new base frame of the device 10.

As shown in FIG. 3, if the system base frame mask M is set equal to 4 and the system base frame offset F is set equal to 2, then the 4 least significant bits $b_3$, $b_2$, $b_1$ and $b_0$ of the subscriber's original base frame $b_6\ b_5\ b_4\ b_3\ b_2\ b_1\ b_0$ are set to zero resulting in a masked base frame of $b_6\ b_5\ b_4 0000$. When the binary representation of the number 2 is added to the masked base frame, a new base frame $b_6\ b_5\ b_4 0010$ is formed. As a result of this transformation, the frame traffic of every 16 frames i.e. $2^4$, is collapsed to a single frame, whose frame number modulo 16 is equal to 2.

This method is extremely flexible and allows the base frame of a selective call receiving device 10 to be dynamically changed so that the controller 12 can service more traffic. For example, to serve a traffic load of one frame per minute in a system such as one utilizing the FLEX™ protocol having 128 frames on a channel during a 4 minute period of time, the system base frame mask M is set to 5 and the system base frame offset is set to any integer between 0 and 31. For another example, with a signaling protocol having one control frame and seven voice frames such as in the InFLEXion™ protocol, in order to set up one control frame every eight frames, the system base frame mask M may be set to 3 and the system base frame offset F may be set to an integer between 0 and $2^3-1=7$. In a mixed system with, for example, light FLEX™ protocol traffic and heavy POCSAG traffic, the system base frame mask M may be set to 6 and the system base frame offset F may be set to an integer between 0 and 63. This method preserves battery life and guarantees that the device 10, operating according to the standard FLEX™ signaling protocol, sees a full FLEX™ protocol frame every 2 minutes.

It is noted that where a system collapse value is transmitted in the control frame information from the controller 12 and the device 10 is programmed to utilize the smaller of a received system collapse value or its own device collapse value as stored in the code plug 42, the system base frame mask M should be set equal to or less than the system collapse value. As can be seen, in accordance with this method, when both the system base frame mask M and system base frame offset F are set to 0, the original base frame stored in the code plug 42 forms the new base frame.

Figure 4:
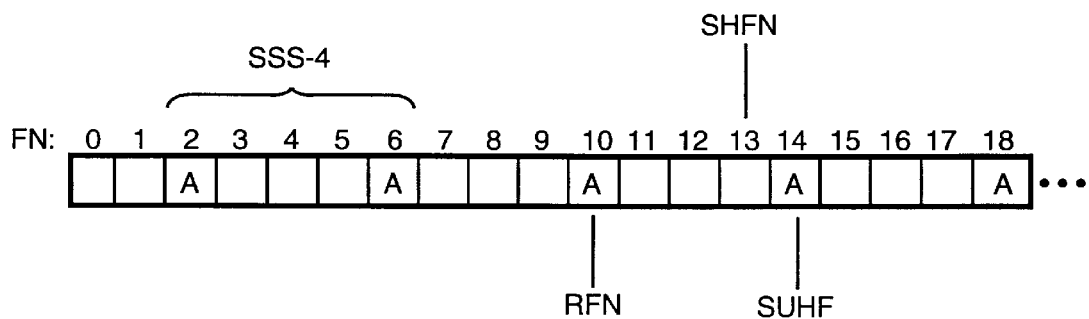
FIG. 4 is a graphic illustration of a second embodiment of the method of the present invention illustrating the transformation of an assigned base frame into a new base frame utilizing control frame information.
Figures 5, 6:
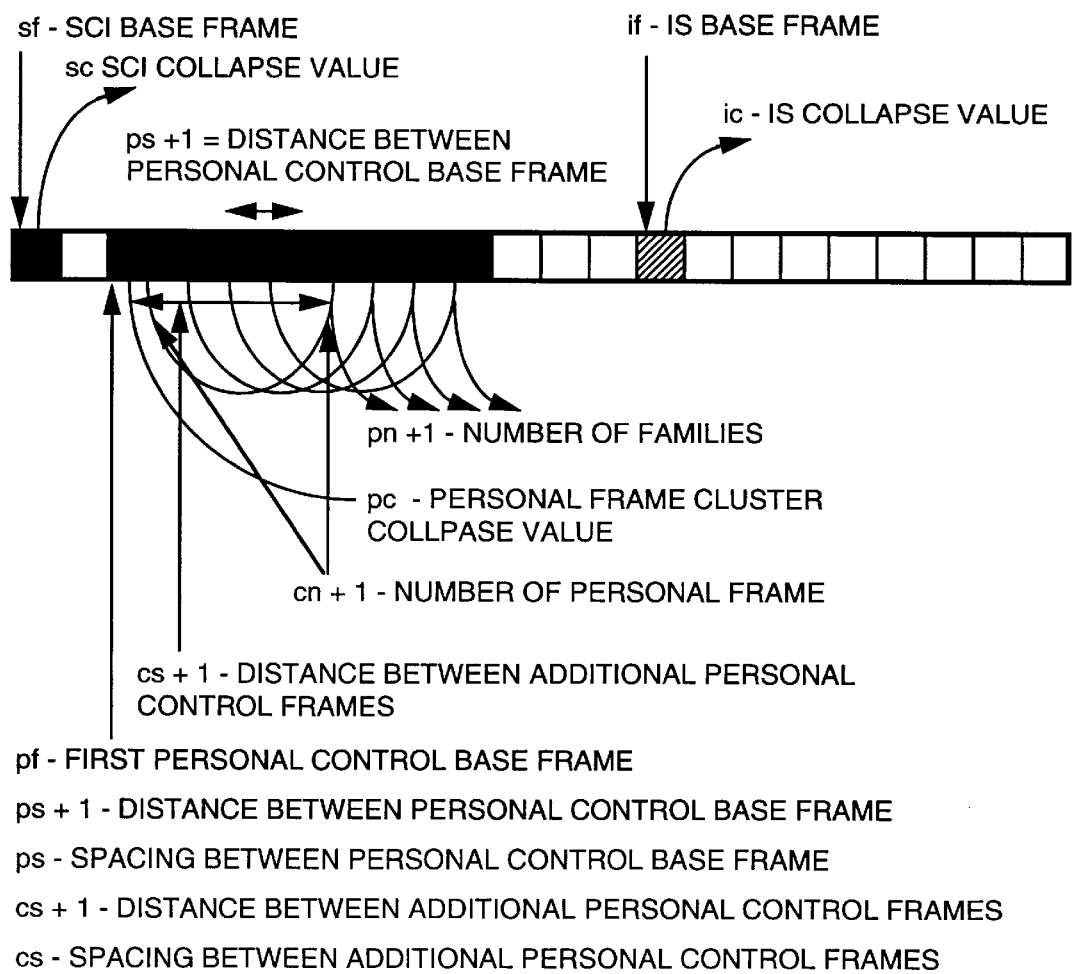
FIG. 5 is an illustration of multiple systems in a bandwidth sharing arrangement as made possible by the method illustrated in FIG. 4.
FIG. 6 is a graphic illustration of a further embodiment of the method of the present invention illustrating control frame information.

A second embodiment of the present invention is illustrated with respect to FIGS. 4 and 5. In accordance with this method, a selective call receiving device 10 derives a new base frame from its originally assigned base frame stored in the code plug memory 42, a system step size SSS and a reference frame number RFN. The system step size, SSS, represents the spacing in terms of the number of frames from one transmission to the next successive transmission from the same service provider in a particular zone/subzone. The value of the system step size SSS can be measured by the device 10 or it may be broadcast in the zone/subzone of the device. For systems in which the signaling protocol is fixed or for systems where the control channel traffic becomes a bottleneck for the system capacity, it is preferable that the selective call receiving device 10 derives the SSS value by monitoring a channel to determine the spacing between successive transmissions of its service provider as determined by a system ID and service provider ID contained within the signal. For systems in which the system step size is broadcast, three bits of information I are added in the frame information word or in the block information words of the signaling protocol, where I is used to determine SSS. If all of the frequency channels in a particular system share the same SSS, the I bits can be carried in the frame information word or in the block information word other than those used for outbound channels. Otherwise, if different outbound channels in the system require their own SSS, the I bits are preferably carried in the block information words for the outbound channels.

The value of the three bits of information I ranges from 0 to 7 and is mapped to system step size ranges from 1 to 128 by setting SSS equal to $2^I$. For example, if a broadcast I is set equal to 011 or 3, the next active frame for the system will be SSS=$2^3$=8 frames away. If I=0, the system uses every frame of a frequency channel as a control frame. The power of 2 mapping for the system step size is selected to reduce the additional control information introduced by this method and to simplify the derivation of the new base control frame and subsequent control frame locations.

It is noted, that in accordance with this method, if a zone is not subdivided into subzones, the zone is treated as a subzone. Further, due to the interference of nearby subzones, the transmission quality of subzone specific information is typically unacceptable if the control information is simulcast inside the zone. However, in accordance with the present method, the orthogonal nature of the subzone control channel ensures the control channel quality in the subzone environment. All of the common zone information, such as the zone ID, is repeated in the subzones on the orthogonal control channels. Because control information is simulcast in a subzone, this method is flexible and efficient.

It is further noted that the number of systems that share the frequency channels, the number of service providers that share the system, the traffic demands from various systems and the traffic distribution of different systems in each zone/subzone are unpredictable. Thus, the required capacity and the location of the control channels of a system from a given service provider in a zone/subzone are also unpredictable. As a result, the control channel that a selective call receiving device 10 is looking for may be in any one of the frames of a given signaling protocol cycle. Therefore, in accordance with this method, the selective call receiving device 10 searches all of the physical channels where a physical channel is defined as the combination of a frequency channel and a particular time frame, until a frame with the correct system ID and service provider ID is found. The correct system ID and the correct service provider ID are those that are associated with the selective call receiving device 10. The frame number of the first found frame with the selective call receiving device's system ID and service provider ID is designated as the reference frame number RFN.

In accordance with this method, the new base frame designated as SUHF for a selective call receiving device 10 is derived from the reference frame number RFN, the system step size SSS and the device's originally assigned base frame number, herein designated as SHFN, in accordance with the following equation:

$$SUHF=\mathrm{mod}(RFN,\ SSS)+SHFN-\mathrm{mod}(SHFN,\ SSS).$$

FIG. 4 illustrates an example of a new base frame calculation wherein the abbreviation FN refers to frame number and A indicates that a system associated with the selective call receiving device 10 is active in a particular frame in the zone/subzone. In this example, it can be seen that the system associated with the device 10 has a system step size of 4, i.e. each frame in which the system of the device 10 is active is the fourth frame from the succeeding frame in which the system of the device 10 is active. In this example, it is assumed that the reference frame number is 10 and that the base frame number of the selective call receiving device is equal to 13. Then, in accordance with the above equation for calculating the new base frame SUHF, it is found that $$SUHF=\mathrm{mod}(10,\ 4)+13-\mathrm{mod}(13,\ 4)=14.$$

In order to determine subsequent control frames in one cycle of a signaling protocol for a selective call receiving device 10 in accordance with this second method, a device step size value SUSS is defined as the spacing in frames from one frame in which the device can access its associated system/service provider to the next successive frame in which the device can access its system/service provider. SUSS may be defined by the following equation:

$$SUSS=\max(\min(CM,CV),\ SSS)$$

where CM is the system collapse mask or value and CV is the collapse value of the device 10 as stored in the code plug memory 42. If, in the above example, the device's collapse value CV is 16 and the system collapse value is 32, then $$SUSS=\max(\min(32,\ 16),4)=16.$$

In accordance with this method, the selective call receiving device 10 needs to wake up to detect its address in a received signal for only the following frames:

$$\text{wake up frame}=SUHF+n(SUSS)$$

where n ranges from 0 to N−1 and N is an integer set equal to 128/SUSS for a system having a signaling protocol with 128 frames per cycle. In the above example, the selective call receiving device 10 therefore wakes up in frames 14, 30, 46, 62, 78, 94, 110 and 126. All of the systems operating in the mixed systems environment implement the control channel access rules set out in the above equations defining SUHF and SUSS to enable dynamic channel sharing. It is noted that in an environment in which channels are not shared among different systems, SSS is equal to 1, SUHF is equal to SHFN and SUSS=min(CM, CV).

Utilizing the method described above allows various channel sharing arrangements in a zone/subzone among various systems with different signaling protocols in the FLEX™ family. FIG. 5 illustrates one possible channel sharing scheme wherein SYSTEM I, SI, may have for example a standard FLEX™ signaling protocol, SYSTEM II, SII, may have a POCSAG signaling protocol where SYSTEM I and SYSTEM II share the same frequency channel F1 in a particular zone/subzone. In this arrangement all of the even frames of the frequency channel F1 are used for SYSTEM I; whereas the odd frames of the frequency channel F1 are used for SYSTEM II. SYSTEM III, SIII, may have an InFLEXion™ signaling protocol that has access to three frequency channels with a system step size SSS equal to 4. The SYSTEM IV may have a ReFLEX™ signaling protocol where SYSTEM IV shares the frequency channel F3 with the SYSTEM III and SYSTEM IV has a system step size SSS that is equal to 8. It is noted that the various customers of a system may have different step sizes. Further, all of the blank frames may be used for message traffic reuse among different systems. This method is simple, dynamic and spectrum efficient.

In accordance with a third embodiment of the present invention as illustrated in FIGS. 6–9, clusters are employed for dynamic frame management. A cluster is a group of frames where the frames can be control frames and/or message frames. A set of clusters is formed by grouping certain clusters in one cycle of a signaling protocol. A set of clusters can be considered a time division multiplex channel. Two or more paging systems or subzones can share the same physical channels using the cluster set concept. Paging systems or subzones can use different sets of clusters of the same frequency, because they are orthogonal in time.

Reference frames designated in this embodiment as system configuration information (SCI) frames are those frames that carry forward channel information, reverse channel information, ALOHA time-out and base frame management information. The location of the first SCI frame in one cycle of the signaling protocol is selected by the system controller 12. The subsequent SCI frames are determined by a system configuration collapse value. The first system configuration frame or system configuration base frame is designated as sf. The system configuration collapse value is designated by sc, as shown in FIG. 6 where SCI frames are spaced by $2^{sc}$. For a signaling protocol having 128 frames in a cycle, the system configuration collapse value sc may be within the range 0–7.

In accordance with the present method, a selective call receiving device scans the frequency channels for a reference or system configuration frame sf. Once a system configuration frame is found, the device 10 checks the service provider ID included in this frame. If the service provider ID is associated with the device 10, the device 10 utilizes frame management information included in the system configuration frame to derive a new base frame for the device 10 as well as subsequent control frames. The frame management information in the systems configuration frame includes the system configuration collapse value sc as well as the following additional information: if, ic, pc, pf, pn, ps, cn and cs. The value "if" represents the first Information Services (IS) frame in a cycle of the signaling protocol where IS frames are used to carry broadcast messages for information services such as sports, weather, group messages, etc. The subsequent IS frames are determined by an information service collapse mask that is given by the value ic. IS frames are spaced by $2^{ic}$ frames. For a signaling protocol having 128 frames in a cycle, the first information services frame in a cycle may vary within the range 0–127 and the information service collapse mask ic may vary within the range of 0–7. A step value pc contained in the frame management information represents a cluster collapse value wherein $2^{pc}$ represents the distance between the first frame of each cluster of the same set. A pf value represents a first possible device control frame in one cycle of a signaling protocol. The sum (pn+1) represents the number of device families i.e. signaling protocols that are defined for a cluster. A ps value represents the distance between device control frames in each cluster. A cn value represents the number of additional control frames that each selective call receiving device checks in a cluster and cs is another distance value representing the distance between additional device control frames in each cluster for the same device 10.

A selective call receiving device can determine the location of all of the system configuration information (SCI) frames based on the following equation:

$$SCI\ frames = sf + i(2^{sc})$$

where i=0, 1, 2, . . .
It is noted that this frame calculation as well as those described below are based on modulo 128 for signaling protocols having 128 frames per cycle. For example, if sf is set equal 10 and sc is set equal to 5 then the SCI frames are 10, 42, 74 and 106.

The information services or IS frames are found in accordance with the following equation:

$$IS\ frames = if + i(2^{ic})$$

where i=0,1, 2, . . .
Again, since all frame calculations are based on modulo 128, if the value ic equals 7, then $2^{ic}=2^7=128$, so that there is only one IS frame identified by if.

A selective call receiving device 10 derives its new base frame from the value pf which is a first possible base control frame and the step value ps that represents the spacing between different base control frames for other devices in the same system as the device 10. More specifically, the device 10 calculates its new base frame in accordance with the following equation: base frame$_i$=pf+i(ps+1) where i= 0, . . . , pn. The value i is determined for a particular selective call receiving device 10 in accordance with the address of the device. Specifically, i is defined by the equation:

$$i = \text{mod}(\text{right shift }(a, 11), pn+1).$$

For example, if a selective call receiving device has an address of 00000000000000001000000000000, then right shift (00000000000000001000000000000, 11)= 00000000000000000010. Where there are 4 device families so that pn+1=4, the value i for this selective call receiving device is equal to 2. Therefore, when the value i=2 is used to calculate the base frame for this selective call receiving device where the first possible base control frame in the cycle, pf, is equal to 10 and ps is equal to 1, then the new base frame calculated for this particular selective call receiving device is equal to 10+2(2)=14.

In order to find the subsequent control frames for a device with an address a, the following equation is employed by the selective call receiving device 10:

control frames$_i$=base frame$_i$+$j(2^{pc})$+$k(cs+1)$ where j=0 . . . $2^{7-pc}$−1 and k=0,1, . . . , cn.

Therefore, if cn is set to 0 and pc is set to 5, the device 10, having the address in the above example, has control frames at 14, 46, 78 and 110.

The controller 12 can calculate the starting frames of the clusters in the same set according to the following equation:

cluster starts=$pf$+$j(2^{pc})$ where j=0, . . . , $2^{7-pc}$−1
For example, where pc is set equal to 5, the clusters of the set start at 10, 42, 74 and 106.

Figure 7:
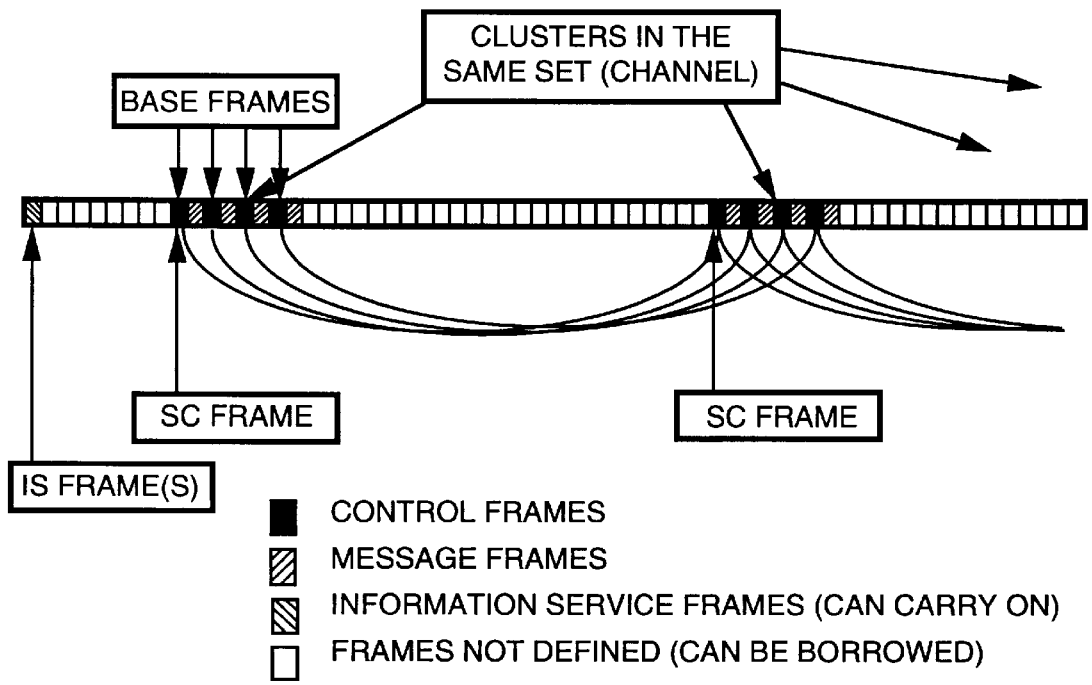
FIG. 7 is an illustration of a first design example implemented in accordance with the method depicted in FIG. 6.

FIG. 7 illustrates the design of a system in accordance with this third embodiment of the present invention wherein the system parameters are as follows. There are four clusters in each cycle having 128 frames so that 128/4=32=$2^5$ and pc=5. In each cluster there are 8 frames, 4 of which are control frames so that ps+1=8/4=2 and ps=1. Four device families are defined in the system so that pn+1=4 and pn=3. Each device 10 checks only one of the control frames in each cluster so that cn=0. Further, there are 4 system configuration frames in each cycle so that 128/4=32=$2^5$ and sc=5. An IS frame is in the beginning of each cycle and it can carry on to the following frames if necessary. In addition to the above, the system configuration frame starts at frame 10 so that sf=10 and the first possible control frame starts at frame 10 so that pf=10. Based on these parameters, the system configuration frames are 10, 42, 74 and 106. The IS frame is 0. The 4 clusters start at 10, 42, 74 and 106. The cluster length is 8. The base frames for the 4 device families are respectively 10, 12, 14 and 16 and the corresponding control frames for the device families are:

control frames$_0$=10, 42, 74 and 106 control frames$_1$=12, 44, 76 and 108 control frames$_2$=14, 46, 78 and 110 control frames$_3$=16, 48, 80 and 112

It is noted that a set of clusters of control frames for other systems can be inserted into the blank frames that are not used by the systems or device families described above.

Figure 8:
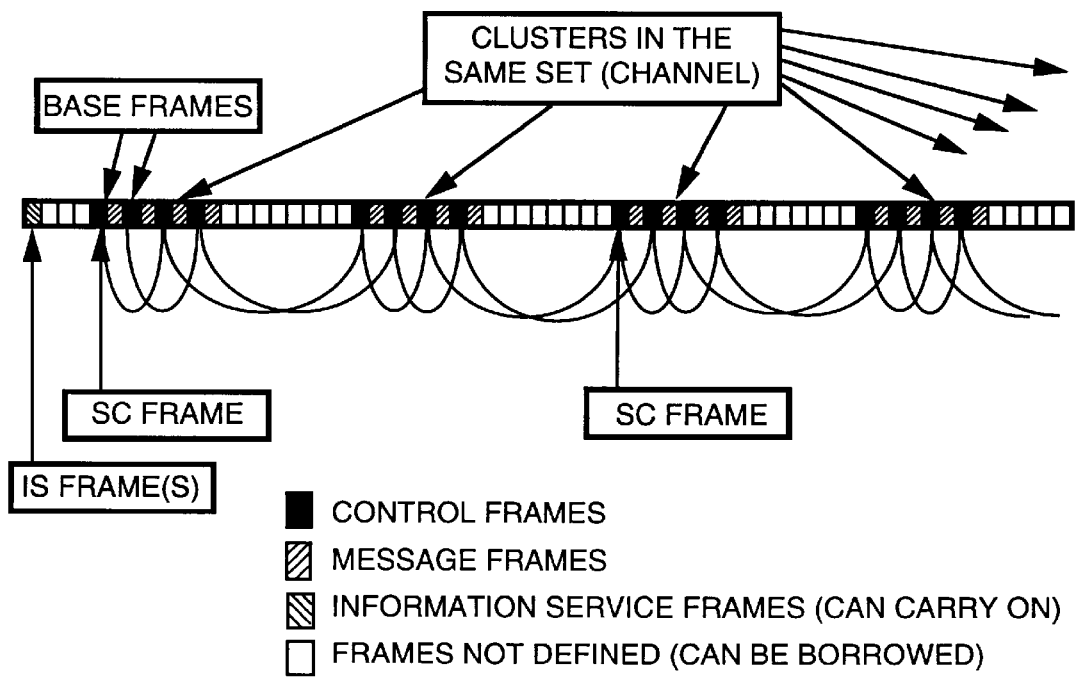
FIG. 8 is an illustration of a second design example implemented in accordance with the method depicted in FIG. 6.

In a second example of this embodiment of the present invention as illustrated in FIG. 8, there are 8 clusters in each cycle so that pc=4. In each cluster there are 8 frames, 4 of which are control frames so that ps=1. Two device families are defined in this system so that pn+1=2 and pn=1. Each device 10 checks two of the control frames in each cluster so that cs+1=8/2=4 and cs=3 and cn+1=2 so that cn=1. There are four system configuration frames in each cycle so that 128/4=32=$2^5$ and sc=5. Further, 2 IS frames are in each cycle so that the IS frames start at frame 0 and appear every 64 frames. Therefore, if=0 and ic=6 since 64=$2^6$. If the first system configuration frame starts at frame 4 so that sf=4 and the first control frame starts at frame 4 so that pf=4 then, these system parameters result in the following. The system configuration frames are 4, 36, 68 and 100. The IS frames are 0 and 64. The eight clusters start at frames 4, 20, 36, 52, 56, 84, 100 and 116. The cluster length is 8. The base frames for the device families are 4 and 6. Further, the corresponding control frames for device families are:

control frames$_0$=4, 8, 20, 24, 36, 40, 52, 56, 68, 72, 84, 88, 100, 104, 116 and 120 control frames$_1$=6, 10, 22, 26, 38, 42, 54, 58, 70, 74, 86, 90, 102, 106, 118 and 122

Figure 9:
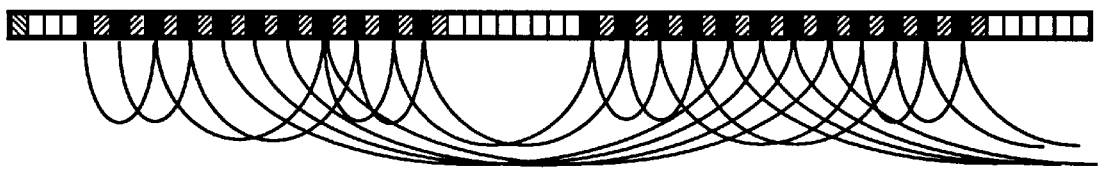
FIG. 9 is a third system design example implemented in accordance with the method depicted in FIG. 6.

Using the dynamic frame management technique of this third embodiment, multiple systems can share the same channel by time division multiplexing the systems. Most of the frames in the previous two examples are orthogonal in time such that they do not overlap in the time domain. These systems can be mixed to operate on the same frequency channel as shown in FIG. 9 wherein the IS frames can be shared between the systems if desired. The parameters of these systems can be changed dynamically to have different sharing combinations and more systems can be added so that this embodiment is very flexible.

Thus, it should be clear from the preceding disclosure that the present invention provides a method and apparatus for mixing protocols in a radio messaging system. The method and apparatus advantageously allows receiving devices utilizing one type of protocol to apply base frame management capability to perform battery saving throughout frame time slots that are allocated to another type of protocol. The method and apparatus also provides for dynamically incrementing capacity available for sending information in one type of protocol in a frame time slot normally allocated to another type of protocol.

Many modifications and variations of the present invention are possible in light of the above teachings. Thus, it is to be understood that, within the scope of the appended claims, the invention may be practiced otherwise than as described herein above.

What is claimed is:

1. A method for controlling a selective call receiving device having an associated system of a plurality of different systems sharing a frequency channel, said selective call receiving device having parameters assigned thereto including at least one assigned address and an assigned base frame and said method controlling said device to dynamically change the base frame assigned to the device, said assigned base frame determining a time that the device is operative to look for the device's address in a received signal, the method comprising:

storing a first base frame assigned to said device and an address assigned to said device;

receiving a signal having control frame information and a reference frame identifying one of said different systems;

determining whether said reference frame identifies said associated system;

determining a step value from said control frame information when said received signal identifies said associated system; and deriving a new base frame for said device in accordance with one of said assigned parameters, said reference frame and said step value to change the time that the device is operative to look for the device's address in said received signal.

2. A method for controlling a selective call receiving device as recited in claim 1 wherein said new base frame is derived from said reference frame, said step value and said first base frame assigned to said device.

3. A method for controlling a selective call receiving device as recited in claim 1 wherein said new base frame is derived from said reference frame, said step value and said address assigned to said device.

4. A method for controlling a selective call receiving device as recited in claim 1 wherein said step of determining whether said reference frame identifies said associated system includes searching the frames of one or more channels until a frame is found that includes information identifying said associated system.

5. A method for controlling a selective call receiving device as recited in claim 4 wherein said information identifying the system that is associated with the device includes a system identification and a service provider identification.

6. A method for controlling a selective call receiving device as recited in claim 1 wherein said new base frame is determined by mod(RFN, SSS)+SHFN−mod(SHFN, SSS) where RFN is a number associated with said reference frame, SSS is said step value and SHFN is a number associated with said first base frame.

7. A method for controlling a selective call receiving device as recited in claim 1 wherein said reference frame includes information identifying a first possible base control frame and said step value represents the spacing between different base control frames for other devices in the same system as said device and said new base frame assigned to said device is derived from said first possible base control frame, said step value, and said device's address.

8. A method for controlling a selective call receiving device having an associated system, at least one assigned address, and an assigned base frame, said method controlling said device to dynamically change the base frame assigned to the device, said assigned base frame determining a time that the device is operative to look for the device's address in a received signal, the method comprising:

storing a first base frame assigned to said device;

receiving a signal having a reference frame identifying a system, said received signal including control frame information X and said reference frame having an associated reference frame number;

determining whether the received signal includes a reference frame identifying said associated system;

determining a step value from said control frame information X if said received signal identifies said associated system, said step value being represented by $2^X$;

modifying said first base frame in accordance with said reference frame number and said step value to derive a new base frame; and determining in accordance with said step value a number of frames from which said new base frame is spaced to a next successive control frame that is assigned to said device.

9. A method for controlling a selective call receiving device as recited in claim 8 wherein said new base frame is determined by mod(RFN, SSS)+SHFN−mod(SHFN, SSS) where RFN is said reference frame number, SSS is said step value and SHFN is a number associated with said first base frame.

10. A method for controlling a selective call receiving device as recited in claim 8 wherein said device includes an assigned device collapse value that is stored in said device; said received signal includes a system collapse value; and said step of determining a number of frames from which the new base frame is spaced to a next successive control frame includes the steps of determining the minimum of the device collapse value and said system collapse value; and determining the maximum of said minimum and said step value, said maximum representing the number of frames from which the new base frame is spaced to a next successive control frame.

11. A method for controlling a selective call receiving device having an associated system, an associated service provider, at least one assigned address and an assigned base frame, said method controlling said device to dynamically change the base frame assigned to the device, said assigned base frame determining a time that the device is operative to look for the device's address in a received signal, the method comprising:

storing a first base frame assigned to said device;

detecting in the received signal a reference frame identifying one of a plurality of systems and a service provider and a plurality of frames transmitted by said one of the plurality of systems, said reference frame having a reference frame number;

determining whether said reference frame identifies said associated system;

measuring a step value from the spacing between frames transmitted by said one of the plurality of systems when said reference frame identifies said associated system and the service provider associated with said device; and modifying said first base frame in accordance with said reference frame number and said step value to derive a new base frame.

12. A method for controlling a selective call receiving device as recited in claim 11 wherein said new base frame is determined by mod(RFN, SSS)+SHFN−mod(SHFN, SSS) where RFN is said reference frame number, SSS is said step value and SHFN is a number associated with said first base frame.

13. A method for controlling a selective call receiving device as recited in claim 11 including the step of determining in accordance with said step value a number of frames from which said new base frame is spaced to a next successive control frame that is assigned to said device.

14. A method for controlling a selective call receiving device as recited in claim 13 wherein said device includes an assigned device collapse value that is stored in said device; said received signal includes a system collapse value; and said step of determining a number of frames from which the new base frame is spaced to a next successive control frame includes the steps of determining the minimum of the device collapse value and said system collapse value and determining the maximum of said minimum and said step value, said maximum representing the number of frames from which the new base frame is spaced to a next successive control frame.

15. A method for controlling a selective call receiving device having an associated system, at least one assigned address, and an assigned base frame, said method controlling said device to dynamically change the base frame assigned to the device, said assigned base frame determining a time that the device is operative to look for the device's address in a received signal, the method comprising:

storing a value representing a first base frame assigned to said device, said first base frame value being formed of a plurality of bits;

receiving information representing a system base frame mask X and a system base frame offset that is a number between 0 and $2^X-1$; and modifying said first base frame value with said base frame mask and said base frame offset to provide a new base frame to change the time that the device is operative to look for the device's address in said received signal.

16. A method for controlling a selective call receiving device as recited in claim 15 wherein said modifying step includes the steps of replacing each of X least significant bits in said first base frame value with a zero; and adding said base frame offset to provide said new base frame.

17. A method for controlling a selective call receiving device having an associated system of a plurality of different systems sharing a frequency channel, said selective call receiving device having parameters assigned thereto including at least one assigned address and an assigned base frame and said method controlling said device to dynamically change the base frame assigned to the device, said assigned base frame determining the time that the device is operative to look for the device's address in a received signal, the method comprising:

storing a first base frame assigned to said device and an address assigned to said device;

receiving a signal having control information and a reference frame identifying one of said different systems;

determining whether said received signal identifies said associated system;

retrieving control frame information from said received signal when said received signal identifies said associated system, said control frame information including an identity of a first possible device control frame; and deriving a new base frame for said device from information assigned to said device and from said first possible device control frame.

18. A method for controlling a selective call receiving device as recited in claim 17 wherein said new base frame is derived from the address assigned to said device and said first possible device control frame.

19. A method for controlling a selective call receiving device as recited in claim 17 wherein said control frame information includes a step value X and said method includes determining a subsequent control frame for said device based on said new base frame plus an integer times $2^X$.

20. A method for controlling a selective call receiving device as recited in claim 19 wherein a plurality of control frames are grouped in a cluster for a plurality of selective call receiving devices and said control frame information includes a first distance value representing the distance between control frames within a cluster, said new base frame being derived from said information assigned to said device, said first possible device control frame and said first distance value.

21. A method for controlling a selective call receiving device as recited in claim 20 wherein said control frame information includes a second distance value representing the distance between control frames associated with one device in one cluster and said control frames for said one device are determined based upon said new base frame for said one device plus a first integer times $2^X$ plus a second integer times said second distance value.

22. A method for controlling a selective call receiving device as recited in claim 17 wherein said control frame information includes a value representing the number of systems in said plurality of different systems and said new base frame is derived from the address assigned to said device, said first possible device control frame and said value representing the number of systems in said plurality of different systems.

23. A method for controlling a selective call receiving device having an associated system, at least one assigned address, and an assigned base frame, said method controlling said device to dynamically change the base frame assigned to the device, said assigned base frame determining a time that the device is operative to look for the device's address in a received signal, the method comprising:

storing a first base frame assigned to said device and an address assigned to said device;

receiving a signal having control information and a reference frame identifying a system;

determining whether the received signal identifies said associated system;

retrieving control frame information from said received signal if said received signal identifies said associated system, said control frame information including the identity of a first possible device control frame; and deriving a new base frame for said device from said address assigned to said device and from said first possible device control frame.

24. A method for controlling a selective call receiving device as recited in claim 23 wherein said control frame information includes a step value X and said method includes determining a subsequent control frame for said device based on said new base frame plus an integer times $2^X$.

25. A method for controlling a selective call receiving device as recited in claim 24 wherein a plurality of control frames are grouped in a cluster for a plurality of selective call receiving devices and said control frame information includes a first distance value representing the distance between control frames within a cluster, said new base frame being derived from said address assigned to said device, said first possible device control frame and said first distance value.

26. A method for controlling a selective call receiving device as recited in claim 25 wherein said control frame information includes a second distance value representing the distance between control frames associated with one device in one cluster and said control frames for said one device are determined based upon said new base frame for said one device plus a first integer times $2^X$ plus a second integer times said second distance value.

* * * * *